US012607803B2

(12) United States Patent (10) Patent No.: US 12,607,803 B2
Murata et al. (45) Date of Patent: Apr. 21, 2026

(54) OPTICAL WAVEGUIDE ELEMENT, AND OPTICAL TRANSMISSION APPARATUS AND OPTICAL MODULATION DEVICE USING SAME

(71) Applicant: SUMITOMO OSAKA CEMENT CO., LTD., Tokyo (JP)

(72) Inventors: Yumi Murata, Tokyo (JP); Yuki Kugimoto, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 71 days.

(21) Appl. No.: 18/279,021

(22) PCT Filed: Sep. 30, 2021

(86) PCT No.: PCT/JP2021/036276
§ 371 (c)(1),
(2) Date: Aug. 25, 2023

(87) PCT Pub. No.: WO2023/053403
PCT Pub. Date: Apr. 6, 2023

(65) Prior Publication Data
US 2024/0134117 A1    Apr. 25, 2024
US 2024/0230993 A9    Jul. 11, 2024

(51) Int. Cl.
*G02B 6/122*        (2006.01)
*G02B 6/12*         (2006.01)
(Continued)

(52) U.S. Cl.
CPC ........... *G02B 6/1228* (2013.01); *G02B 6/122* (2013.01); *G02B 6/14* (2013.01); *G02B 6/30* (2013.01);
(Continued)

(58) Field of Classification Search
CPC ........ G02B 6/1228; G02B 6/14; G02B 6/305; G02B 6/122; G02B 6/30; G02F 1/035
See application file for complete search history.

(56) References Cited

U.S. PATENT DOCUMENTS

2007/0122072 A1    5/2007    Kondou
2009/0116802 A1    5/2009    Kondou
(Continued)

FOREIGN PATENT DOCUMENTS

JP        H05249331 A        9/1993
JP        2006284961 A       10/2006
(Continued)

*Primary Examiner* — Michael P Mooney
(74) *Attorney, Agent, or Firm* — IpHorgan Ltd.

(57)        ABSTRACT

An optical waveguide device in which an optical loss is reduced by removing an air bubble inside an adhesive layer for joining a reinforcing member from near an optical waveguide or the like even in a case where a protruding part such as a rib type optical waveguide or a spot size converter is formed on an optical waveguide substrate is provided. An optical waveguide device includes an optical waveguide substrate (1, 2) provided with an optical waveguide (10, 12), and a reinforcing member (3) disposed on an upper side of the optical waveguide (10, 12) near an end portion of the optical waveguide (10, 12), the optical waveguide substrate (1, 2) and the reinforcing member (3) being joined through an adhesive layer (4), in which a protective layer (13) that covers the optical waveguide (10, 12) is provided on the optical waveguide (10, 12) positioned on a lower side of the reinforcing member (3), and the adhesive layer (4) is disposed outside the protective layer (13).

11 Claims, 5 Drawing Sheets

(51) Int. Cl.
G02B 6/14 (2006.01)
G02B 6/30 (2006.01)

(52) U.S. Cl.
CPC .... G02B 6/305 (2013.01); *G02B 2006/12097*
(2013.01)

(56) References Cited

U.S. PATENT DOCUMENTS

| | | | |
|---|---|---|---|
| 2013/0170793 A1 | 7/2013 | Ushida | |
| 2013/0308898 A1 | 11/2013 | Doerr | |
| 2021/0157176 A1* | 5/2021 | Miyazaki | ............. G02B 6/2773 |

FOREIGN PATENT DOCUMENTS

| | | | |
|---|---|---|---|
| JP | 2007264487 A | 10/2007 |
| JP | 2015191110 A | 11/2015 |
| JP | 2020086137 A | 6/2020 |
| JP | 2022155261 A | 10/2022 |
| WO | 2012042708 A1 | 4/2012 |
| WO | 2020004637 A1 | 1/2020 |

* cited by examiner

*PRIOR ART*

12(IL)   13   3
4
14
1
2 w2

10(1)

C

10   IL

1

12(IL)

C'

IL(12)

10

1

OPTICAL WAVEGUIDE ELEMENT, AND OPTICAL TRANSMISSION APPARATUS AND OPTICAL MODULATION DEVICE USING SAME

CROSS REFERENCE TO RELATED APPLICATIONS

This application is a national stage completion application of PCT Application No. PCT/JP2021/036276, filed Sep. 30, 2021. This PCT application is incorporated by reference herein in its entirety.

TECHNICAL FIELD

The present invention relates to an optical waveguide device, and an optical modulation device and an optical transmission apparatus using the same and, particularly to an optical waveguide device including an optical waveguide substrate provided with an optical waveguide, and a reinforcing member disposed on an upper side of the optical waveguide near an end portion of the optical waveguide, the optical waveguide substrate and the reinforcing member being joined through an adhesive layer.

BACKGROUND ART

In the field of optical measurement technology or in the field of optical communication technology, optical waveguide devices such as an optical modulator using a substrate on which an optical waveguide is formed have been widely used. For example, the optical waveguide is formed by thermally diffusing Ti or the like on the substrate of lithium niobate (LN) or the like having an electro-optic effect. In the optical waveguide substrate on which the optical waveguide is formed, input light is introduced from the outside or output light is output to the outside. In order to introduce the input light from the outside into the optical waveguide on the substrate, an optical block such as an optical fiber or a lens is connected to an end surface of the substrate on which an input unit of the optical waveguide is formed. In addition, in order to appropriately output the output light, an optical block such as an optical fiber, a lens, polarization combining means, or reflection means is connected to an end surface of the substrate on which an output unit of the optical waveguide is formed.

In connecting the optical blocks to the optical waveguide substrate, the reinforcing member is fixed on the substrate along the end surfaces of the optical waveguide substrate using an adhesive (adhesive layer) in order to more firmly fix the optical blocks. Accordingly, the optical blocks are joined to end surfaces of two of the optical waveguide substrate and the reinforcing member.

In joining the optical waveguide substrate to the reinforcing member using the adhesive, an air bubble included in the adhesive layer may not escape after joining, and the air bubble may remain on the optical waveguide substrate, particularly on or near the optical waveguide. In this case, for example, a light wave propagating through the optical waveguide is scattered while passing near the air bubble and causes an optical loss. In addition, the optical waveguide obtained by thermally diffusing Ti or the like forms a protruding part of approximately 50 nm on the optical waveguide substrate. Thus, a phenomenon in which it is difficult for the air bubble to escape because of the protruding part occurs.

Meanwhile, in accordance with an increase in information communication amount in recent years, a high frequency and a large capacity of optical communication used between cities or between data centers at a long distance have been desired. In addition, a high frequency and size reduction of the optical modulator are required because of a restricted space of a base station.

In achieving size reduction of the optical modulator, narrowing a width of the optical waveguide to form a micro optical waveguide can increase a confining effect of light. Consequently, a bending radius of the optical waveguide is decreased, and size reduction can be achieved. For example, lithium niobate (LN) has small distortion and a small optical loss in converting an electrical signal into an optical signal and thus, is used as a long-distance optical modulator. In the optical waveguide of the LN optical modulator in the related art, for example, in the optical waveguide formed by thermally diffusing Ti, a mode field diameter (MFD) is approximately 10 μm, and the bending radius of the optical waveguide is several tens of mm which is large. Thus, it is difficult to achieve size reduction.

As a method of achieving strong confinement of the light wave in the optical waveguide, a rib type optical waveguide 10 having a protruding part is formed on a surface of a substrate (1) as illustrated in FIGS. 1 to 3. However, while a height of the protruding part formed on the surface of the substrate is approximately 50 nm in the optical waveguide formed by thermally diffusing Ti as described above, the protruding part of the rib type optical waveguide is approximately 1 to several μm. FIG. 1 is a diagram of a plan view near an end portion of the optical waveguide device. FIG. 2 is a cross section view taken along dot-dashed line A-A' in FIG. 1. FIG. 3 is a cross section view taken along dot-dashed line C-C' in FIG. 1. Reference sign 1 is the substrate (a thin plate or a thin film) on which the optical waveguide 10 is formed. Reference sign 2 is a holding substrate that holds the substrate. In FIG. 1, only the protruding part of the rib type waveguide is illustrated in black.

In recent years, substrate polishing techniques and substrate bonding techniques have been improved and enabled LN substrates to be achieved as thin plates, and the MFD of the optical waveguide has also been studied and developed to be 3 μm or lower and approximately 1 μm. Since decreasing the MFD increases the confining effect of light, the bending radius of the optical waveguide can be further decreased.

However, in a case of using an optical waveguide having an MFD smaller than 10 μmφ (for example, 4 μm or lower) which is an MFD of the optical fiber, directly joining an end portion (device end surface) of the optical waveguide provided in the optical waveguide device to the optical fiber causes a significant coupling loss.

In order to eliminate such a problem, disposing a spot size converter (SSC) in the end portion of the optical waveguide is considered. A general SSC is a configuration providing an optical waveguide part of a tapered shape that two-dimensionally or three-dimensionally enlarges the optical waveguide. Examples of the tapered type waveguide are illustrated in Patent Literatures No. 1 to No. 3 for reference.

The tapered type optical waveguide in which a spot size is enlarged by gradually enlarging a core portion of the optical waveguide has a high level of difficulty in adjusting refractive indices of the core portion and a clad portion suitable for the spot size and is likely to cause multiple modes. Thus, designs usable as the SSC of the optical waveguide device are restricted. Furthermore, conversion into a necessary spot size requires forming a relatively long tapered part, and this poses a problem of difficulty in size reduction of the optical waveguide device.

The present applicant has suggested the SSC illustrated in FIGS. 4 to 6. A tip end of the rib type optical waveguide 10 has a tapered shape (part corresponding to a region a) of a narrowing width, and a block portion 12 as a core portion is disposed to surround the tapered shape. A refractive index of the block portion 12 is set to be lower than a refractive index of the optical waveguide 10. An adhesive of which a refractive index is lower than that of the block portion 12 by approximately 0.01 to 0.03 is disposed around the block portion 12. In this SSC, forming the tip end of the optical waveguide 10 to have a tapered shape in a covered state with the block portion 12 decreases an effective refractive index in the part of the optical waveguide 10 having the tapered shape and weakens confinement of light. Accordingly, modes of light transition to the block portion 12, and the block portion 12 functions as the core portion of the optical waveguide to implement a larger MFD than the optical waveguide 10. In FIG. 4, a part of the protruding part of the rib type optical waveguide not covered with the block portion 12 is illustrated in black.

Furthermore, an optical block such as an optical fiber or a lens is connected to an end surface (on the lower side of the drawing of FIG. 1 or 4 or on the right side of the drawing of FIG. 3 or 6) of the optical waveguide substrate. A reinforcing member 3 is provided to reinforce a substrate side in the connection. The optical waveguide substrate 1 and the reinforcing member 3 are joined by an adhesive (adhesive layer) 4. In FIG. 1, reference sign 30 denotes a position of an other end surface of the reinforcing member 3. However, a position at which the end surface is disposed is not limited to the denoted position.

As described above, the optical waveguide formed by thermally diffusing Ti has a problem in that it is difficult for the air bubble included in the adhesive layer to escape between the optical waveguide substrate and the reinforcing member 3. Similarly, in a case where the protruding part such as the structure of the rib type optical waveguide 10 in FIG. 2 or of the block portion 12 of the SSC in FIG. 5 that protrudes high is present on a surface joined to the reinforcing member 3, movement of an air bubble B included in the adhesive layer is blocked by the protruding object and is likely to remain in the adhesive layer 4. Particularly, in a case where a height H of the rib type optical waveguide in FIG. 3 is compared with that (a height of approximately 50 nm) of the optical waveguide formed by thermally diffusing Ti in the related art, the height H is approximately 50 times higher in a case where the height H is, for example, 2.5 μm. Furthermore, in a case where the height H of the SSC in FIG. 5 is, for example, 3 μm or higher, the height H is higher than that of the rib type optical waveguide in the related art, and this makes the problem further noticeable. In addition, since the adhesive (adhesive layer) 4 and the air bubble B have different refractive indices, the propagating light wave is affected by scattering or the like because of presence of the air bubble B near the optical waveguide 10, and this causes the optical loss.

In order to eliminate such a problem, Patent Literature No. 4 suggests forming a groove on a surface of the reinforcing member 3 facing the optical waveguide substrate 1. The groove collects the air bubble B and actively removes the air bubble B from near the optical waveguide (10, 12).

In addition, in joining the reinforcing member 3 to the optical waveguide substrate 1 through the adhesive layer (adhesive layer) 4 as illustrated in FIG. 2 or FIG. 5, there is a risk that the reinforcing member 3 erroneously comes into contact with the optical waveguide 10 or with the block portion 12 and damages various members. Particularly, in a case where the block portion 12 is configured with a resin material, the block portion 12 has low rigidity. Thus, the risk of damage is further increased.

CITATION LIST

Patent Literature

[Patent Literature No. 1] Japanese Laid-open Patent Publication No. 2006-284961
[Patent Literature No. 2] Japanese Laid-open Patent Publication No. 2007-264487
[Patent Literature No. 3] International Publication No. WO2012/042708
[Patent Literature No. 4] Japanese Patent Application No. 2021-058675 (filed on Mar. 30, 2021)

SUMMARY OF INVENTION

Technical Problem

An object to be solved by the present invention is to solve the above problem and to provide an optical waveguide device in which an optical loss is reduced by removing an air bubble inside an adhesive layer for joining a reinforcing member from near an optical waveguide or the like even in a case where a protruding part such as a diffused waveguide formed of Ti or the like, a rib type optical waveguide, or furthermore, a spot size converter is formed on an optical waveguide substrate. Furthermore, an optical waveguide device in which damage to a protruding part caused by a reinforcing member is suppressed is provided. In addition, an optical modulation device and an optical transmission apparatus using the optical waveguide device are provided.

Solution to Problem

In order to solve the object, an optical waveguide device of the present invention, and an optical modulation device and an optical transmission apparatus using the same have the following technical features.

(1) An optical waveguide device includes an optical waveguide substrate provided with an optical waveguide, and a reinforcing member disposed on an upper side of the optical waveguide near an end portion of the optical waveguide, the optical waveguide substrate and the reinforcing member being joined through an adhesive layer, in which a protective layer that covers the optical waveguide is provided on the optical waveguide positioned on a lower side of the reinforcing member, and the adhesive layer is disposed outside the protective layer.

(2) In the optical waveguide device according to (1), the optical waveguide is a rib type optical waveguide.

(3) In the optical waveguide device according to (1) or (2), a width of the protective layer is set to be twice or more than a width of the optical waveguide.

(4) In the optical waveguide device according to any one of (1) to (3), a spot size converter that changes a mode field diameter of a light wave propagating through the optical waveguide is disposed in the end portion of the optical waveguide as a part of the optical waveguide.

(5) In the optical waveguide device according to (4), an optical waveguide part connected to the spot size converter is provided with a low refractive index layer that covers the optical waveguide part, the low refractive index layer forms a part of a core part of the spot size converter, and the protective layer in the spot size converter forms a clad part that covers the low refractive index layer.

(6) In the optical waveguide device according to (5), the low refractive index layer covering the optical waveguide part serves as a protective layer other than the spot size converter.

(7) In the optical waveguide device according to (5) or (6), a width of the protective layer forming the clad portion of the spot size converter is 1.4 times or more than a width of the low refractive index layer forming the core portion.

(8) In the optical waveguide device according to any one of (4) to (7), an optical waveguide part connected to the spot size converter is provided with an extending part that extends inside the spot size converter, and the extending part has a tapered part in which a width changes in a tapered manner.

(9) In the optical waveguide device according to (8), the tapered part has a shape of a plurality of level differences in a height direction of the optical waveguide.

(10) In the optical waveguide device according to any one of (1) to (9), a support member that is disposed to interpose the optical waveguide is provided between the optical waveguide substrate and the reinforcing member.

(11) An optical modulation device includes the optical waveguide device according to any one of (1) to (10), a case accommodating the optical waveguide device, and an optical fiber through which a light wave is input into or output from the optical waveguide.

(12) In the optical modulation device according to (11), the optical waveguide device includes a modulation electrode for modulating the light wave propagating through the optical waveguide, and an electronic circuit that amplifies a modulation signal to be input into the modulation electrode of the optical waveguide device is provided inside the case.

(13) An optical transmission apparatus includes the optical modulation device according to (11) or (12), and an electronic circuit that outputs a modulation signal causing the optical modulation device to perform a modulation operation.

Advantageous Effects of Invention

In the present invention, an optical waveguide device includes an optical waveguide substrate provided with an optical waveguide, and a reinforcing member disposed on an upper side of the optical waveguide near an end portion of the optical waveguide, the optical waveguide substrate and the reinforcing member being joined through an adhesive layer, in which a protective layer that covers the optical waveguide is provided on the optical waveguide positioned on a lower side of the reinforcing member, and the adhesive layer is disposed outside the protective layer. Thus, the protective layer can suppress contact of an air bubble inside the adhesive layer with the optical waveguide or presence of the air bubble near the optical waveguide, and an optical loss of a light wave propagating through the optical waveguide can be reduced. Furthermore, it is possible to provide an optical waveguide device in which damage to a protruding part such as the optical waveguide caused by the reinforcing member is suppressed by providing a support member that is disposed to interpose the optical waveguide. Furthermore, it is possible to provide an optical modulation device and an optical transmission apparatus using the optical waveguide device.

DESCRIPTION OF EMBODIMENTS

Hereinafter, an optical waveguide device of the present invention will be described in detail using preferred examples.

Figure 7:
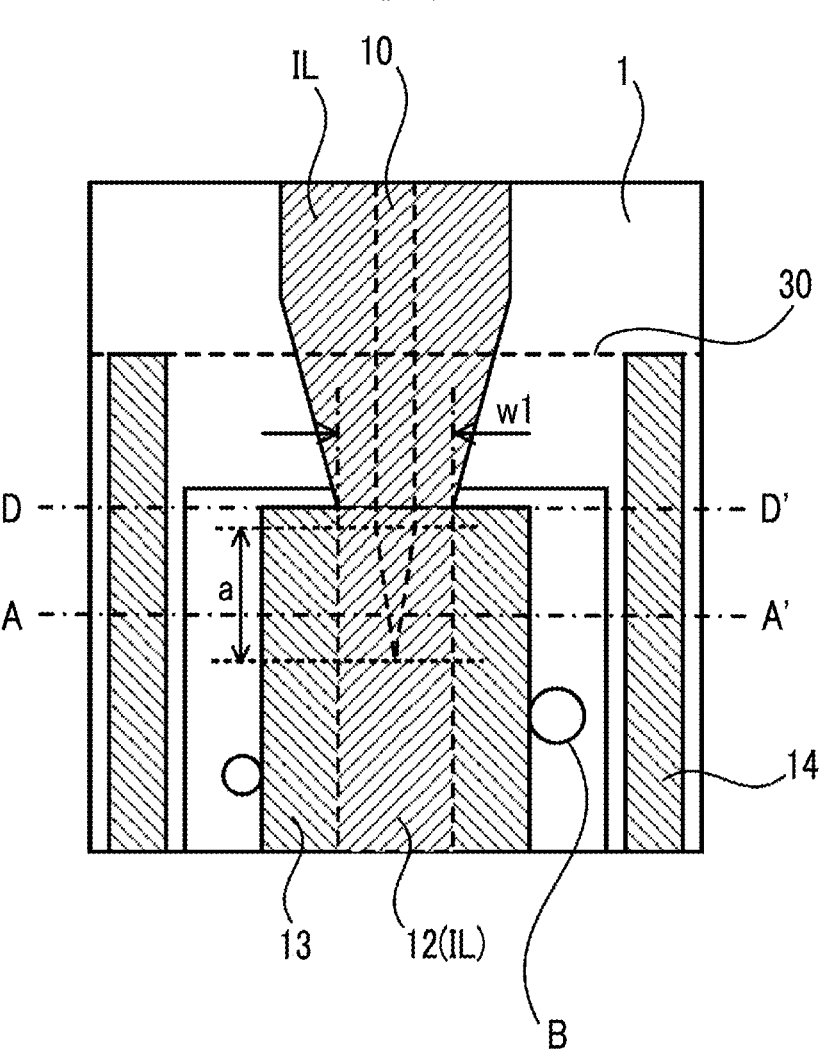
FIG. 7 is a plan view illustrating an example related to the optical waveguide device of the present invention.
Figure 8:
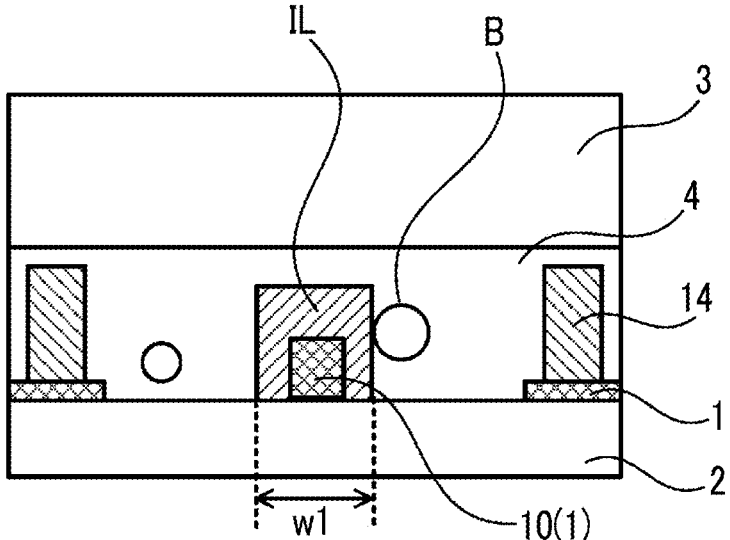
FIG. 8 is a cross section view taken along dot-dashed line D-D' in FIG. 7.
Figure 9:
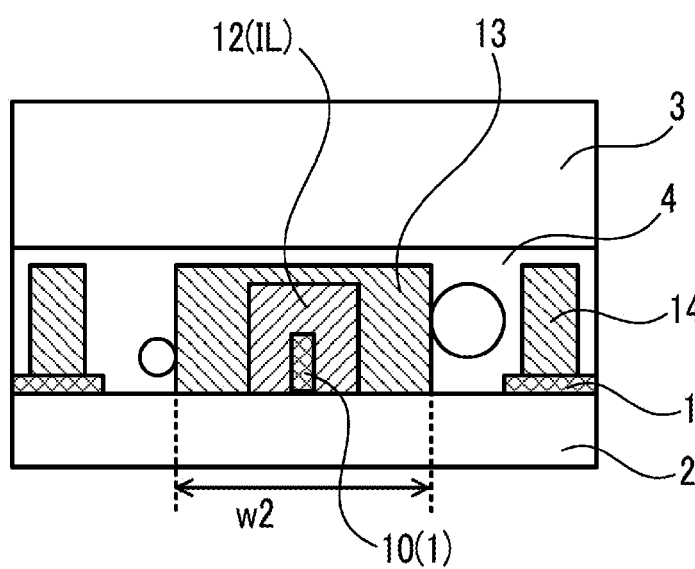
FIG. 9 is a cross section view taken along dot-dashed line A-A' in FIG. 7.

As illustrated in FIGS. 7 to 9, the optical waveguide device of the present invention includes an optical waveguide substrate 1 provided with an optical waveguide 10 (12), and a reinforcing member 3 disposed on an upper side of the optical waveguide near an end portion of the optical waveguide, the optical waveguide substrate and the reinforcing member being joined through an adhesive layer 4, in which a protective layer (IL, 13) that covers the optical waveguide is provided on the optical waveguide positioned on a lower side of the reinforcing member, and the adhesive layer 4 is disposed outside the protective layer.

As the material 1 having an electro-optic effect as the optical waveguide substrate 1 used in the optical waveguide device of the present invention, a substrate of lithium niobate (LN), lithium tantalate (LT), lead lanthanum zirconate titanate (PLZT), or the like, a vapor-phase growth film formed of these materials, or the like can be used.

In addition, various materials such as semiconductor materials or organic materials can also be used as the optical waveguide.

Furthermore, the "optical waveguide substrate" in the present invention is a concept including not only the substrate having the electro-optic effect but also a "holding substrate" described later.

As a method of forming the optical waveguide 10, a method of forming the optical waveguide 10 by thermally diffusing Ti or the like on the LN substrate or a rib type optical waveguide obtained by forming a part corresponding to the optical waveguide to have a protruding shape on a substrate by, for example, etching the substrate 1 other than the optical waveguide or by forming grooves on both sides of the optical waveguide can be used. Furthermore, a refractive index can be further increased by diffusing Ti or the like on a surface of the substrate using a thermal diffusion method, a proton exchange method, or the like in accordance with the rib type optical waveguide. While the rib type optical waveguide and an SSC will be mainly described in the following description, the same idea also applies to other optical waveguides having a protruding part, such as a Ti diffused waveguide.

A thickness of the substrate (thin plate) on which the optical waveguide 10 is formed is set to be 10 μm or lower, more preferably 5 μm or lower, and still more preferably 1 μm or lower in order to achieve velocity matching between a microwave of a modulation signal and a light wave. In addition, a height of the rib type optical waveguide is set to be 4 μm or lower, more preferably 3 μm or lower, and still more preferably 1 μm or lower or 0.4 μm or lower. In addition, it is also possible to form a vapor-phase growth film on a holding substrate 2 and to process the film to have a shape of the optical waveguide.

The substrate 1 on which the optical waveguide is formed is adhesively fixed to the holding substrate 2 via direct joining or through an adhesive layer of resin or the like in order to increase mechanical strength. As the holding substrate 2 to be directly joined, a substrate including an oxide layer of a material such as crystal, glass, sapphire, or the like that has a lower refractive index than the optical waveguide and than the substrate on which the optical waveguide is formed, and that has a similar coefficient of thermal expansion to the optical waveguide or the like is preferably used. Composite substrates, abbreviated to SOI and LNOI, obtained by forming a silicon oxide layer on a silicon substrate and by forming a silicon oxide layer on an LN substrate can also be used.

The "optical waveguide substrate" in the present invention is a concept including not only the "optical waveguide" and the "substrate on which the optical waveguide is formed" but also the "holding substrate".

Figure 1:
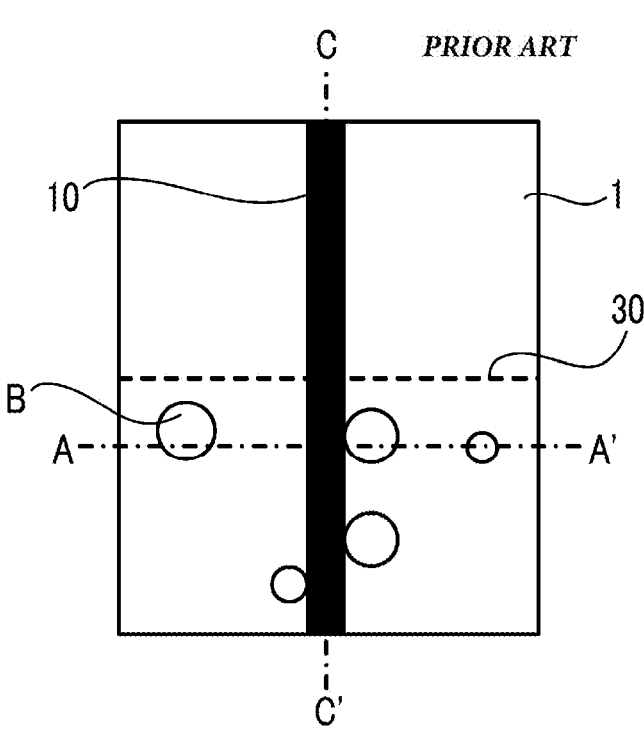
FIG. 1 is a plan view of an optical waveguide device using a rib type optical waveguide in the related art.
Figure 2:
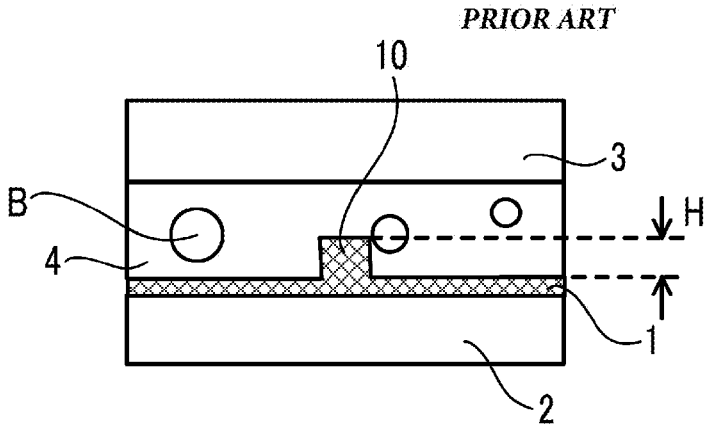
FIG. 2 is a cross section view taken along dot-dashed line A-A' in FIG. 1.
Figure 3:
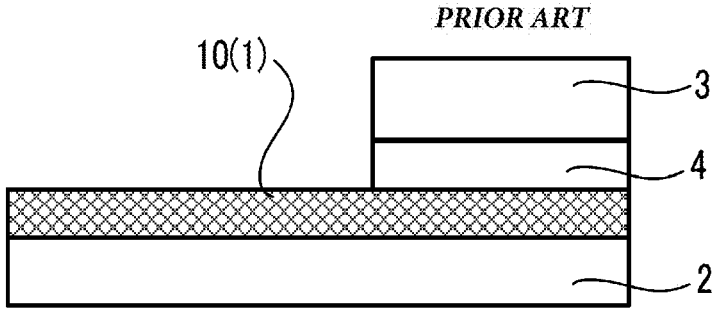
FIG. 3 is a cross section view taken along dot-dashed line C-C' in FIG. 1.
Figure 4:
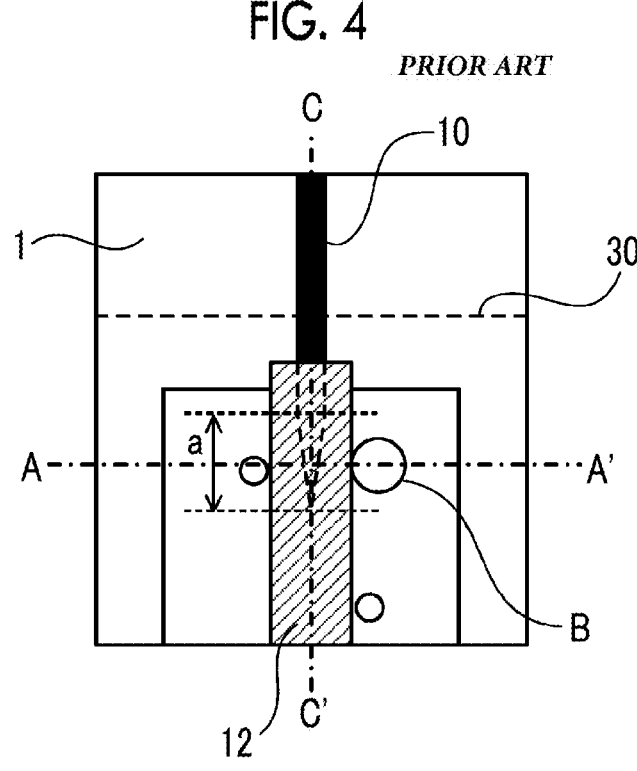
FIG. 4 is a plan view of an optical waveguide device using a spot size converter.
Figure 5:
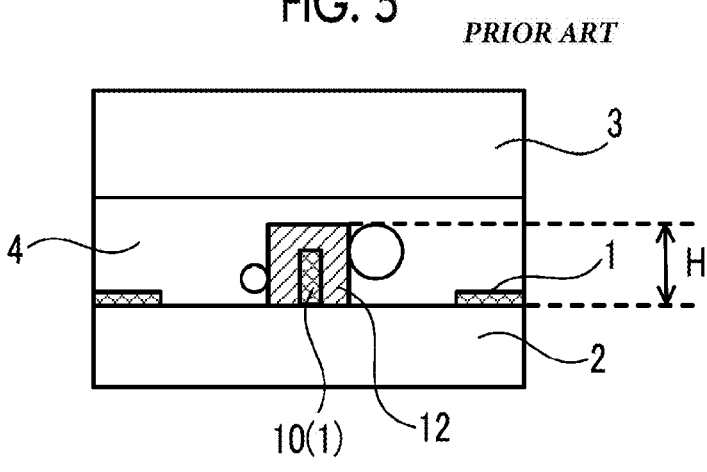
FIG. 5 is a cross section view taken along dot-dashed line A-A' in FIG. 4.
Figure 6:
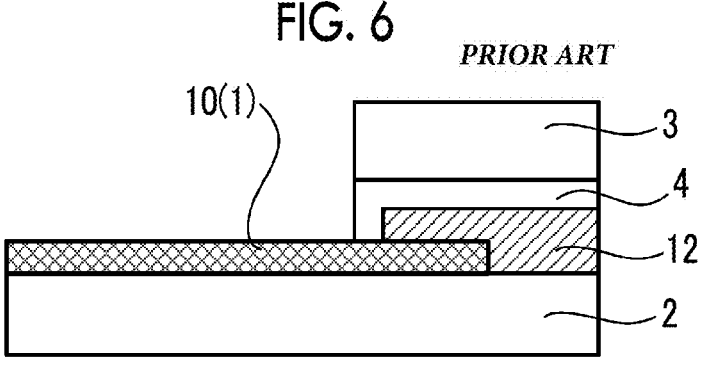
FIG. 6 is a cross section view taken along dot-dashed line C-C' in FIG. 4.

In a case where a height of the optical waveguide 10 is 1 μm or lower, a block body 12 of a spot size converter (SSC) similar to that in FIGS. 4 and 5 is formed as illustrated in FIGS. 7 and 9. The present invention is not limited to the spot size converter in FIGS. 7 and 9 and may use a spot size converter of a tapered shape illustrated in Patent Literatures No. 1 to 3. While the spot size converter here has been described as a configuration in which a tip end of the rib type optical waveguide has a tapered shape of a narrowing width and in which the block portion 12 as a core portion is disposed to surround the tapered shape, the present invention is not limited to the configuration and may use a shape in which the width of the tip end of the rib type optical waveguide is gradually enlarged without using the block portion.

As described in FIGS. 1 to 6, in the optical waveguide device of the present invention, the reinforcing member 3 is disposed on the upper side of the optical waveguide (rib type optical waveguide 10) or of the spot size converter (SSC). A material having approximately the same refractive index and the same linear expansion coefficient as the holding substrate 2 is used in the reinforcing member 3. In a case where linear expansion coefficients match, a problem such as detachment of the reinforcing member (upper substrate) because of thermal stress can be reduced, and an optical waveguide device having excellent thermostability is obtained. An adhesive formed of UV curable resin, resin such as acryl-based resin or epoxy-based resin, or the like can be used in the adhesive (adhesive layer) 4 with which the reinforcing member 3 is joined to the optical waveguide substrate 1 or to the holding substrate 2.

A feature of the optical waveguide device of the present invention is suppressing an increase in optical loss of the optical waveguide caused by contact of an air bubble inside the adhesive layer with the optical waveguide or by presence of the air bubble near the optical waveguide, by forming the protective layer on the optical waveguide (including the SSC) in a part in which the optical waveguide substrate and the reinforcing substrate are joined through the adhesive layer.

FIG. 7 is a plan view illustrating an example of the optical waveguide device of the present invention. FIG. 8 and FIG. 9 illustrate a cross section view taken along dot-dashed line D-D' in FIG. 7 and a cross section view taken along dot-dashed line A-A' in FIG. 7, respectively.

The optical waveguide 10 in FIG. 8 is covered with a low refractive index layer IL as the protective layer. Presence of the protective layer (IL) can suppress an air bubble B inside the adhesive layer 4 approaching the optical waveguide 10.

The low refractive index layer IL can also be used as a material of the block portion 12 constituting the SSC as illustrated in FIG. 7.

The low refractive index layer IL constituting the protective layer is preferably a dielectric having a refractive index higher than 1 and has a lower refractive index than a refractive index of the optical waveguide 10. Specifically, the refractive index of the low refractive index layer IL is set to be 0.5 times or higher and 0.75 times or lower than the refractive index of the optical waveguide 10. In addition, the low refractive index layer is an insulating layer and has an insulating property with respect to an electrode disposed near the optical waveguide 10.

A width w1 of the protective layer (low refractive index layer IL) is preferably set to be twice or more than a width of the optical waveguide 10. For reference, the width w1 of the low refractive index layer IL at a position of the narrowest width is illustrated in FIG. 7.

While the low refractive index layer IL can be formed of an inorganic material such as $SiO_2$ using a sputtering method or a CVD method, an organic material such as resin may be used. As resin, a photoresist including a coupling agent (crosslinking agent) can be used, and a so-called photosensitive insulating film (permanent resist) that is cured by a crosslinking reaction developed by heat can be used. As resin, other materials such as polyamide-based resin, melamine-based resin, phenol-based resin, amino-based resin, and epoxy-based resin can also be used.

Next, a protective layer used in the SSC will be described. As illustrated in FIG. 9, a protective layer 13 is disposed to cover the block portion 12 constituting a core part of the optical waveguide constituting the SSC. In FIGS. 7 to 9, the optical waveguide part 10 connected to the spot size converter (SSC) is provided with the low refractive index layer IL covering the optical waveguide part. The low refractive index layer IL forms a part (block portion 12) of a core part of the spot size converter, and the protective layer 13 in the spot size converter forms a clad part covering the low refractive index layer (12, IL).

While the material of the low refractive index layer IL described above can be used as a material used in the protective layer 13, it is more preferable to use a photosensitive insulating film (permanent resist) or the like.

In FIG. 7 and FIG. 8, as described above, the low refractive index layer IL covering the optical waveguide part 10 serves as a protective layer other than the spot size converter.

A relationship among a refractive index n1 of the low refractive index layer IL (12), a refractive index n2 of the protective layer 13, a refractive index n3 of the adhesive layer 4, and furthermore, a refractive index n0 of the optical waveguide 10 illustrated in FIGS. 7 to 9 can be shown by the following formula.

$$n0 > n1 > n2 \geq n3 \qquad \text{(Formula)}$$

This formula is established because the low refractive index layer IL functions as the clad part of the optical waveguide part 10. In addition, this formula is established because the protective layer 13 functions as the clad part of the SSC including the block portion 12. In the SSC, an MFD is set to be gradually enlarged from the optical waveguide part 10 (1) to the block portion 12 (IL).

In addition, in order to convert the MFD from 1 μm to 3 to 5 μm, a difference (n1−n2) between the refractive index of the low refractive index layer IL and the refractive index of the protective layer 13 is set to be preferably 0.01 to 0.05 and more preferably 0.02 to 0.04.

A width w2 of the protective layer 13 in the SSC is preferably set to be 1.4 times or more than a width of the block portion 12 constituting the core part of the optical waveguide. The same applies to a height (thickness) of the protective layer 13.

Figure 10:
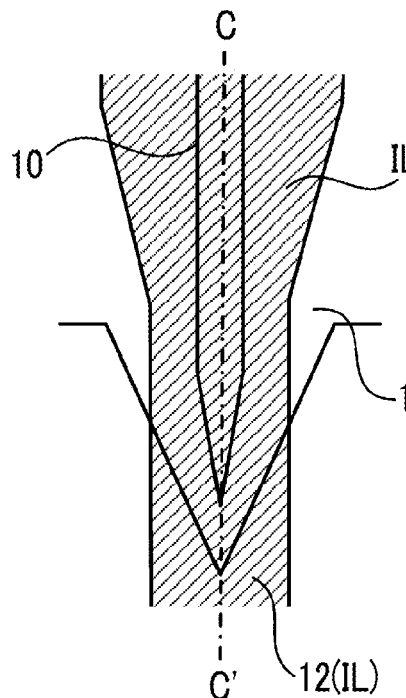
FIG. 10 is a diagram for describing another example of a tapered shape of a rib type optical waveguide used in the optical waveguide device of the present invention.
Figure 11:
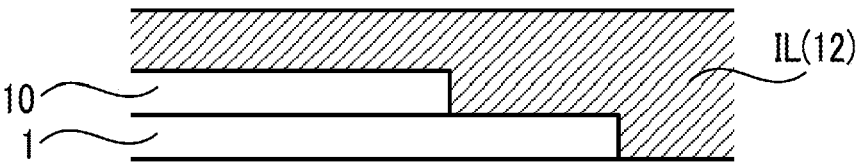
FIG. 11 is a cross section view taken along dot-dashed line C-C' in FIG. 10.

In FIG. 7, the optical waveguide part 10 (1) connected to the spot size converter (SSC) is provided with an extending part that extends inside the spot size converter, and the extending part has a tapered part (part corresponding to a region a) in which a width changes in a tapered manner. The present invention is not limited to the optical waveguide part 10 in FIG. 7. As illustrated in FIG. 10 and FIG. 11 (a cross section view taken along dot-dashed line C-C' in FIG. 10), a shape of a plurality of level differences can be formed in a height direction of the optical waveguide as the shape of the tapered part by forming both of the protruding part 10 and the substrate 1 positioned on a lower side of the protruding part 10 to have tapered shapes and by adjusting positions and shapes of the tapered shapes.

In addition, while the widths of the optical waveguide (protruding part 10) and the substrate 1 are gradually changed in a tapered manner in FIGS. 7 and 10, the present invention is not limited to the optical waveguide and the substrate 1 in FIGS. 7 and 10. The thicknesses of the optical waveguide 10 and the substrate 1 may be gradually decreased, or both may be combined with each other.

Another feature of the optical waveguide device of the present invention is providing a support member 14 that is disposed to interpose the optical waveguide, between the optical waveguide substrate 1 (2) and the reinforcing member 3. The support member 14 can suppress damage to the optical waveguide 10 and the SSC caused by contact with the reinforcing member 3.

In addition, in a case where the support member 14 is present, the air bubble inside the adhesive layer (4) is more unlikely to escape. Thus, an advantage of providing the protective layer 13 in the present invention is increased.

While the support member 14 can be formed using the same material and the same process as the low refractive index layer IL, the protective layer 13, and the like, the support member 14 is preferably formed of a material having higher hardness. In addition, in a plan view of the reinforcing member 3, an area occupied by the support member 14 with respect to an area of the reinforcing member 3 is preferably set to be within a range of 10% to 60%.

Figure 12:
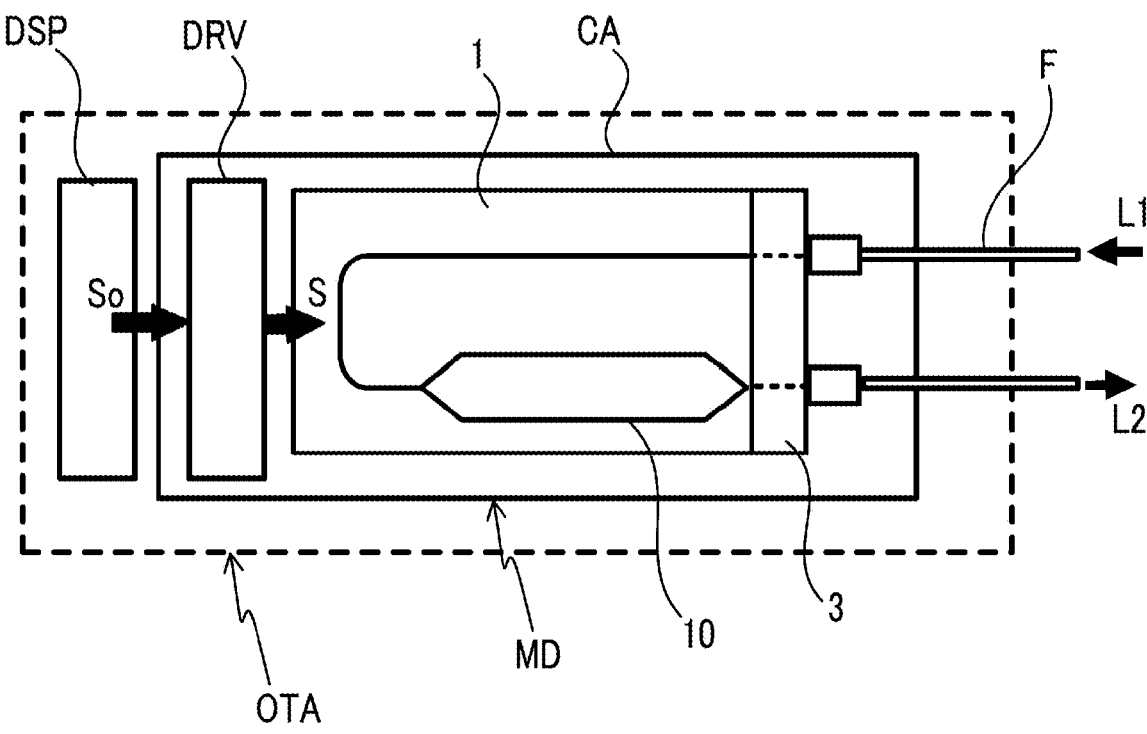
FIG. 12 is a plan view for describing an optical modulation device and an optical transmission apparatus using the optical waveguide device of the present invention.

In the optical waveguide device of the present invention, a modulation electrode that modulates the light wave propagating through the optical waveguide 10 is provided in the optical waveguide substrate 1 and is accommodated inside a case CA as illustrated in FIG. 12. Furthermore, an optical modulation device MD can be configured by providing an optical fiber (F) through which the light wave is input into or output from the optical waveguide. In FIG. 12, the optical fiber is introduced into the case through a through-hole that penetrates through a side wall of the case, and is directly joined to the optical waveguide device. The optical waveguide device and the optical fiber can also be optically connected through a space optical system.

An optical transmission apparatus OTA can be configured by connecting, to the optical modulation device MD, an electronic circuit (digital signal processor DSP) that outputs a modulation signal $S_0$ causing the optical modulation device MD to perform a modulation operation. A modulation signal S to be applied to the optical waveguide device is required to be amplified. Thus, a driver circuit DRV is used. The driver circuit DRV and the digital signal processor DSP can be disposed outside the case CA or can be disposed inside the case CA. Particularly, disposing the driver circuit DRV inside the case can further reduce a propagation loss of the modulation signal from the driver circuit.

INDUSTRIAL APPLICABILITY

As described above, according to the present invention, it is possible to provide an optical waveguide device in which an optical loss is reduced by removing an air bubble inside an adhesive layer for joining a reinforcing member from near an optical waveguide or the like even in a case where a protruding part such as a diffused waveguide formed of Ti or the like, a rib type optical waveguide, or furthermore, a spot size converter is formed on an optical waveguide substrate. Furthermore, it is possible to provide an optical waveguide device in which damage to a protruding part caused by a reinforcing member is suppressed. In addition, it is possible to provide an optical modulation device and an optical transmission apparatus using the optical waveguide device.

REFERENCE SIGNS LIST

1: substrate (thin plate, film body) on which optical waveguide is formed
2: holding substrate (part of optical waveguide substrate)
3: reinforcing member
4: adhesive (adhesive layer)
10: rib type optical waveguide
12: block body (part of SSC)
13: protective layer
IL: low refractive index layer (protective layer)

The invention claimed is:
1. An optical waveguide device comprising:
an optical waveguide substrate provided with a rib type optical waveguide; and
a reinforcing member disposed on an upper side of the optical waveguide near an end portion of the optical waveguide, the optical waveguide substrate and the reinforcing member being joined through an adhesive layer,
wherein a protective layer that covers the optical waveguide is provided on the optical waveguide positioned on a lower side of the reinforcing member,
the adhesive layer is disposed outside the protective layer,
support members that are disposed to interpose the optical waveguide are provided between the optical waveguide substrate and the reinforcing member, and

the adhesive layer is disposed between the protective layer and the support members.

2. The optical waveguide device according to claim 1, wherein a width of the protective layer is set to be twice or more than a width of the optical waveguide.

3. The optical waveguide device according to claim 1, wherein a spot size converter that changes a mode field diameter of a light wave propagating through the optical waveguide is disposed in the end portion of the optical waveguide as a part of the optical waveguide.

4. The optical waveguide device according to claim 3, wherein an optical waveguide part connected to the spot size converter is provided with a low refractive index layer that covers the optical waveguide part, the low refractive index layer forms a part of a core part of the spot size converter, and the protective layer in the spot size converter forms a clad part that covers the low refractive index layer.

5. The optical waveguide device according to claim 4, wherein the low refractive index layer covering the optical waveguide part serves as a protective layer other than the spot size converter.

6. The optical waveguide device according to claim 4, wherein a width of the protective layer forming the clad portion of the spot size converter is 1.4 times or more than a width of the low refractive index layer forming the core portion.

7. The optical waveguide device according to claim 3, wherein an optical waveguide part connected to the spot size converter is provided with an extending part that extends inside the spot size converter, and the extending part has a tapered part in which a width changes in a tapered manner.

8. The optical waveguide device according to claim 7, wherein the tapered part has a shape of a plurality of level differences in a height direction of the optical waveguide.

9. An optical modulation device comprising:
the optical waveguide device according to claim 1;
a case accommodating the optical waveguide device; and
an optical fiber through which a light wave is input into or output from the optical waveguide.

10. The optical modulation device according to claim 9, wherein the optical waveguide device includes a modulation electrode for modulating the light wave propagating through the optical waveguide, and an electronic circuit that amplifies a modulation signal to be input into the modulation electrode of the optical waveguide device is provided inside the case.

11. An optical transmission apparatus comprising:
the optical modulation device according to claim 9; and
an electronic circuit that outputs a modulation signal causing the optical modulation device to perform a modulation operation.

* * * * *